United States Patent
Gail et al.

(10) Patent No.: US 8,500,128 B2
(45) Date of Patent: Aug. 6, 2013

(54) SEALING DEVICE FOR A COOLING AGENT SUPPLY ON A ROTATING SPINDLE AND MACHINE TOOL COMPRISING SUCH A SEALING DEVICE

(75) Inventors: Alfons Gail, Friedberg (DE); Stefan Beichl, Herrsching (DE)

(73) Assignee: MTU Aero Engines GmbH, Munich (DE)

( * ) Notice: Subject to any disclaimer, the term of this patent is extended or adjusted under 35 U.S.C. 154(b) by 164 days.

(21) Appl. No.: 12/452,704

(22) PCT Filed: Jul. 2, 2008

(86) PCT No.: PCT/DE2008/001105
§ 371 (c)(1),
(2), (4) Date: Feb. 26, 2010

(87) PCT Pub. No.: WO2009/010040
PCT Pub. Date: Jan. 22, 2009

(65) Prior Publication Data
US 2010/0171270 A1    Jul. 8, 2010

(30) Foreign Application Priority Data

Jul. 14, 2007   (DE) .......................... 10 2007 032 889

(51) Int. Cl.
*F16J 15/44*    (2006.01)
(52) U.S. Cl.
USPC .......................................... 277/355
(58) Field of Classification Search
USPC ................................ 277/355, 412
See application file for complete search history.

(56) References Cited

U.S. PATENT DOCUMENTS

| | | | |
|---|---|---|---|
| 7,052,015 B2 * | 5/2006 | Addis | 277/355 |
| 7,407,198 B2 | 8/2008 | Ott et al. | |
| 2002/0190473 A1 * | 12/2002 | Tong et al. | 277/355 |
| 2005/0146095 A1 | 7/2005 | Gebert | |
| 2006/0192343 A1 * | 8/2006 | Hashiba et al. | 277/355 |
| 2010/0021247 A1 * | 1/2010 | Aldred et al. | 406/19 |

FOREIGN PATENT DOCUMENTS

| | | |
|---|---|---|
| DE | 103 49 968 | 5/2005 |
| EP | 1 070 888 | 1/2001 |
| JP | 9-196265 | 7/1997 |
| WO | WO03/081095 | 10/2003 |
| WO | WO2006/102782 | 10/2006 |
| WO | WO 2009009189 A2 * | 1/2009 |

OTHER PUBLICATIONS

PCT Examiner Oscar Van Wel, International Search Report of the International Searching Authority for International Application PCT/DE2008/001105, mailed Nov. 6, 2008, 3 pages, European Patent Office, HV Rijswijk, Netherlands.

PCT Examiner Oscar Van Wel, English Translation of PCT Written Opinion of the International Searching Authority for International Application PCT/DE2008/001105, mailed Nov. 6, 2008, 5 pages, European Patent Office, HV Rijswijk, Netherlands.

* cited by examiner

*Primary Examiner* — Gilbert Lee
(74) *Attorney, Agent, or Firm* — W. F. Fasse

(57) ABSTRACT

A sealing device for a coolant supply on a rotating spindle includes a first brush seal and a second brush seal arranged one after another in series on the spindle. An annular leakage chamber is formed axially between the first and second brush seals, and radially between the spindle and a spindle housing.

13 Claims, 1 Drawing Sheet

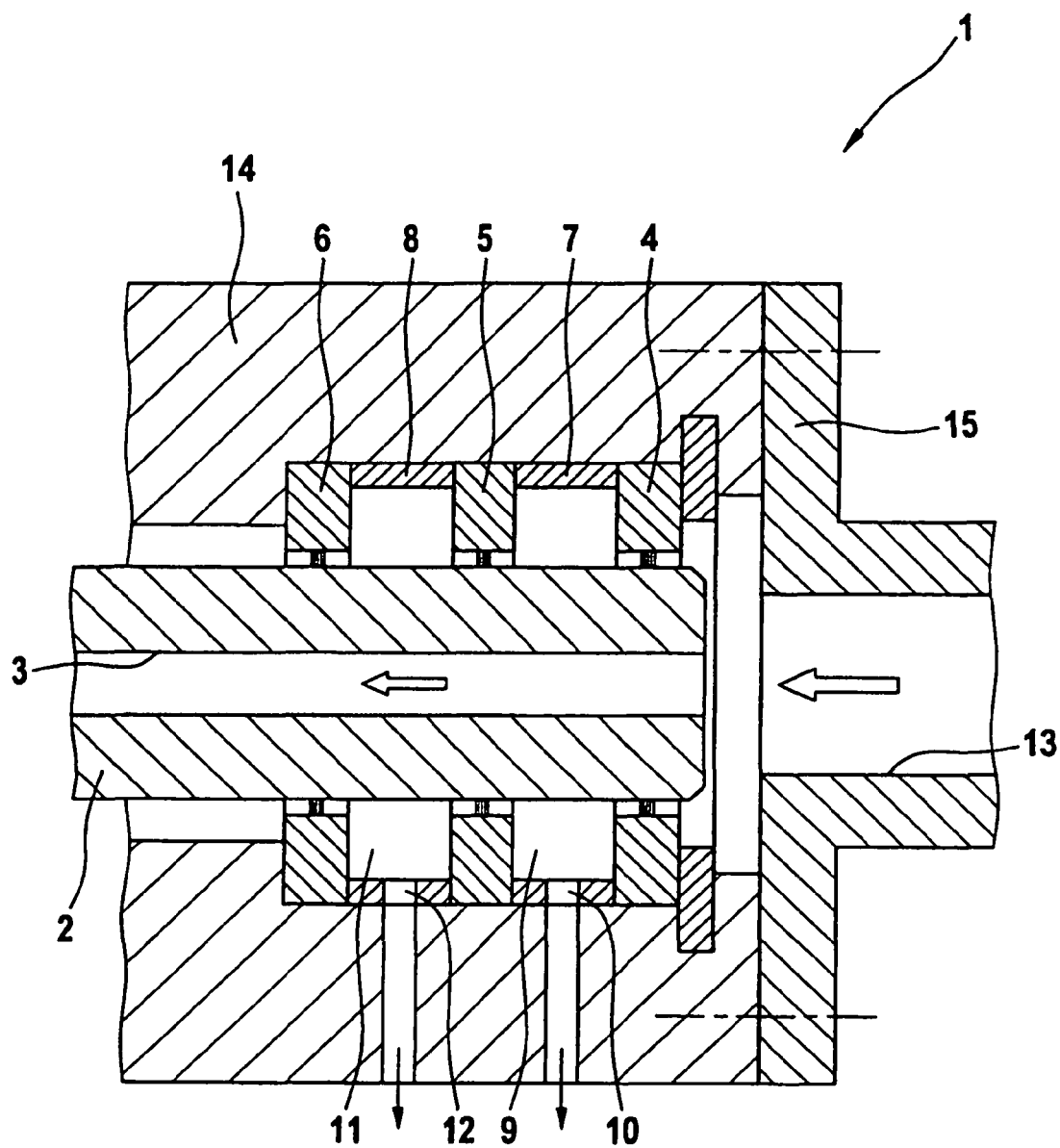

SEALING DEVICE FOR A COOLING AGENT SUPPLY ON A ROTATING SPINDLE AND MACHINE TOOL COMPRISING SUCH A SEALING DEVICE

FIELD OF THE INVENTION

The invention relates to a sealing device using plural brush seals for sealing a coolant supply on a rotating spindle, and to a machine tool with such a sealing device.

BACKGROUND INFORMATION

For the supply of cooling lubricant in connection with rotating spindles, so-called rotary feed inlets are used, which make it possible to introduce a coolant into the quickly rotating spindle shaft, guide the coolant axially through the spindle shaft, and lead-out the coolant at the other spindle end, for example on a tool or a workpiece. At the present time, slide bearing rings of ceramic or ceramic seal disks are used for the sealing of these coolant supplies. These ceramic seal disks are subject to relatively strong wear during operation, are very expensive, and can suddenly fail without advance warning. Upon failure of such seals, the cooling liquid penetrates into the spindle motor, which can lead to a total loss of the spindle.

Such rotary feed inlets for the supply of cooling lubricant in connection with rotating spindles with ceramic seal disks are, for example, sufficiently known from the JP 09196265 A or the DE 10349968 A1.

Although a main seal for spindle shafts is known from the WO 03/081095 A1, which is embodied as a brush seal, nonetheless this serves only as a simple seal against the leaking-out of lubricant and the penetration of dirt particles. A functioning seal for a rotary feed inlet is not set forth therein.

SUMMARY OF THE INVENTION

Therefore it is the underlying object of the invention to provide a machine tool with a spindle that rotates during operation, in which coolant can be guided through the spindle, and which is operationally reliable. Especially it is an object of the present invention, to make available a reliable sealing of the supply of coolant to a quickly rotating tool spindle, which reduces the danger of a sudden failure, and nonetheless is cost-advantageous in production and installation.

This object is achieved according to the invention by a device and a machine tool having features according to the invention as set forth herein.

By the invention, technical problems of the prior art are avoided and an improved apparatus is made available, which makes possible a reliable sealing of the supply of coolant to a quickly rotating tool spindle, which at least reduces the danger of a sudden failure and which is nonetheless cost-advantageous in production and installation.

The sealing device according to the invention for a coolant supply on a rotating spindle comprises a first brush seal and a second brush seal on the spindle, which are arranged one after another in series. Hereby a first chamber is formed, in which the small amount of coolant that passes through the first brush seal collects. Overall, this offers a cost-advantageous and reliable alternative to the previously utilized ceramic seals. In that regard, the brush seals can comprise bristles of metal or synthetic fibers, of electrically conductive or non-conductive materials, or a combination of these materials. In that regard, the material combinations can be achieved both in one brush seal as well as through different materials of the first and the second brush seal.

An advantageous embodiment of the invention provides that a return arrangement of the coolant leakage is provided between the first brush seal and the second brush seal. Thereby, the coolant collected in the first chamber can again be delivered to the cooling circuit. Conclusions about the wear of the brush seals can be drawn by observation of volume fluctuations in the chamber or at the end of the return channel.

An advantageous embodiment of the invention provides that a third brush seal is provided in series with the first and the second brush seal. This brush seal serves to form a second chamber in which coolant collects when there is wear of the first or second brush seal.

An advantageous embodiment of the invention provides that a second return arrangement of the coolant leakage is provided between the second brush seal and the third brush seal. With complete function of the first and second brush seal, the second return arrangement comprises no leakage. If small leakages form due to wear of the second brush seal in the course of the operating time, it is especially signaled to the operator, if the brush seals must be exchanged due to wear. A sudden failure due to breakage or rupture does not arise here. Especially in such a further development, the spindle motor is optimally or very well protected against penetration of the coolant by the two-fold protection.

An advantageous embodiment of the invention provides that a sensor for indicating the seal wear is provided on the second return arrangement of the coolant leakage. This sensor may, for example, be embodied as a liquid level measuring sensor with corresponding display or indicator.

An advantageous embodiment of the invention provides that the brush seals are produced of KEVLAR™ aromatic polyamide fibers. Brush seals with KEVLAR™ fibers are exceptionally suitable for sealing against coolant, because they are corrosion and temperature resistant and exhibit a very low wear.

An advantageous embodiment of the invention provides that the spindle is a tool spindle. Especially for tool spindles in revolver CNC machines, due to the high number of spindles, low-wear and cost-advantageous solutions are of advantage. But also for simple or single machine tools such as turning machines or lathes, or milling machines, an improvement of the reliability and the maintenance-friendliness is achieved.

BRIEF DESCRIPTION OF THE DRAWINGS

Further measures improving the invention are set forth in more detail in the following together with the description of a preferred example embodiment of the invention in connection with the FIGURE. The FIGURE shows:

FIGURE a schematic illustration of an advantageous embodiment of a rotary feed inlet according to the present invention.

DETAILED DESCRIPTION OF AN EXAMPLE EMBODIMENT OF THE INVENTION

The schematic sectional illustration according to the FIGURE shows an advantageous embodiment of a rotary feed inlet 1 according to the present invention. Therein a spindle 2 embodied as a tool spindle with a coolant bore 3 is illustrated, in which the coolant flow to a tool or workpiece, which is not shown, is indicated with an arrow from the right to the left.

The spindle 2 is concentrically supported in a spindle housing 14 produced of cast material. The spindle 2, on its right end in the drawing, comprises a first brush seal 4 arranged over the inner circumference of the spindle housing 14 and received in a recess therein machined by chip removal, and a second brush seal 5 spaced apart therefrom in axial direction by a first spacer bushing 7. Thus a first ring-shaped chamber 9 is formed between the first brush seal 4 and the second brush seal 5. A return channel 10 embodied as a bore through the spacer bushing 7 produced of brass and the spindle housing 14 is provided at the end of the first chamber 9 that is the bottom end in the drawing plane.

A third brush seal 6 follows the second brush seal, whereby the third brush seal is spaced by a second spacer bushing 8. Also here, a second ring-shaped chamber 11 is formed between the second brush seal 5 and the third brush seal 6. A return channel 12 embodied as a bore through the spacer bushing 8 and the spindle housing 14 is provided at the bottom end of the second chamber 11.

The union or combination formed by the brush seals 4, 5, 6 and the spacer bushings 7, 8 is held by a securing ring against a housing shoulder.

An essentially circular housing cover 15 with a concentric supply or feed line 13 is provided at the right end of the spindle housing 14. In that regard, the supply or feed line 13 is embodied as a pressure line for the pressurized coolant.

In that regard, the brush seals are produced of bristles that are arranged in a holder or mount embodied as a holding ring. In that regard, the bristles can be oriented straight or inclined. The bristles can be clamped or secured by a curable material, such as a synthetic resin for example. In the present example embodiment the brush seals are provided with straight-oriented Kevlar bristles.

In operation, coolant flows in the supply or feed line 13 in the direction of the arrow from the right to the left into the spindle housing 14. In that regard, the coolant is under high pressure, in the present example embodiment under a pressure of 100 bar. The first brush seal 4 seals the entire pressure drop with a small leakage. Thus the coolant flows essentially into the coolant bore 3 in the spindle 2.

The cooling liquid collecting in the first chamber 9 between the first brush seal 4 and the second brush seal 5 is guided back into the machine bench.

In contrast, in normal operation no noticeable leakage arises out of the second chamber 11 between the second brush seal 5 and the third brush seal 6. If a noticeable leakage arises here, the operator recognized the necessity of a seal exchange, because a corresponding leakage volume arises only with a corresponding seal wear. The detection and indication of a corresponding leakage volume can here be achieved by a sensor that is not shown. A sudden seal failure can, however, not arise here.

The embodiment shown in the FIGURE is especially an exemplary machine tool according to the invention in a partial view with an exemplary seal device according to the invention.

In its embodiment the present invention is not limited to the preferred example embodiment set forth above. Rather, a number of variations is conceivable, which makes use of the solution presented in the claims, also in embodiments that are basically of a different type.

The invention claimed is:

1. A spindle arrangement comprising:
   a spindle housing with a hollow space therein and with a liquid feed line communicating from outside of the spindle housing into a feed chamber formed within the hollow space;
   a spindle that is rotatably supported in the hollow space, wherein a liquid flow channel extends along the spindle in an axial direction of the spindle, and a feed opening in the spindle communicates from the feed chamber into the liquid flow channel;
   a first brush seal arranged concentrically around the spindle in the hollow space;
   a second brush seal arranged concentrically around the spindle in the hollow space;
   a first leakage drain line; and
   a liquid in at least the feed line, the feed chamber and the liquid flow channel;
   wherein:
   the second brush seal is spaced apart from the first brush seal in the axial direction,
   an annular first leakage chamber is formed in the hollow space and is bounded axially between the first and second brush seals and radially between the spindle and the spindle housing,
   the first brush seal separates the first leakage chamber from the feed chamber,
   the first leakage drain line communicates from the first leakage chamber out of the spindle housing,
   a first wall surface area of the spindle bounding the first leakage chamber is imperforate and without communication into the liquid flow channel, and
   the liquid feed line supplies the liquid as a pressurized liquid to flow from the liquid feed line into the feed chamber at a first liquid pressure and hence to the liquid flow channel, the first and second brush seals hinder leakage of the liquid from the feed chamber past the first brush seal into the first leakage chamber and from the first leakage chamber past the second brush seal respectively, some of the liquid leaks past the first brush seal into the first leakage chamber at a leakage chamber pressure, and the first liquid pressure in the feed chamber is higher than the leakage chamber pressure in the first leakage chamber.

2. The spindle arrangement according to claim 1, further comprising a third brush seal arranged concentrically around the spindle in the hollow space on a side of the second brush seal opposite the first brush seal, wherein the third brush seal is spaced apart from the second brush seal in the axial direction, an annular second leakage chamber is formed in the hollow space and is bounded axially between the second and third brush seals and radially between the spindle and the spindle housing, and the second brush seal separates the second leakage chamber from the first leakage chamber.

3. The spindle arrangement according to claim 2, wherein a second wall surface area of the spindle bounding the second leakage chamber is imperforate and without communication into the liquid flow channel.

4. The spindle arrangement according to claim 2, further comprising a second leakage drain line that communicates from the second leakage chamber out of the spindle housing.

5. The spindle arrangement according to claim 4, further comprising a liquid sensor that is arranged in the second leakage chamber or communicates with the second leakage drain line, and that is adapted to sense a leakage portion of the liquid that has leaked from the feed chamber past the first brush seal into the first leakage chamber and thence past the second brush seal into the second leakage chamber.

6. The spindle arrangement according to claim 1, wherein the brush seals comprise bristles of an aromatic polyamide fiber material.

7. The spindle arrangement according to claim 1, wherein the spindle is a tool spindle of a machine tool.

8. The spindle arrangement according to claim 1, wherein the first brush seal directly bounds the feed chamber and the first leakage chamber.

9. The spindle arrangement according to claim 1, wherein the leakage chamber pressure is substantially equal to an ambient atmospheric pressure prevailing outside of the spindle arrangement.

10. A machine tool comprising the spindle arrangement according to claim 1, a machine bench and a coolant supply that supplies a coolant as the liquid to the liquid feed line, wherein the spindle is a tool spindle of the machine tool, and the spindle housing is stationarily fixed relative to the machine bench.

11. The machine tool according to claim 10, further comprising a labyrinth seal or a slide ring seal on the spindle.

12. The machine tool according to claim 10, wherein the first leakage drain line communicates from the first leakage chamber out of the spindle housing and back to the coolant supply.

13. The machine tool according to claim 12, further comprising a third brush seal arranged concentrically around the spindle in the hollow space on a side of the second brush seal opposite the first brush seal, wherein the third brush seal is spaced apart from the second brush seal in the axial direction, an annular second leakage chamber is formed in the hollow space and is bounded axially between the second and third brush seals and radially between the spindle and the spindle housing, and the second brush seal separates the second leakage chamber from the first leakage chamber, and further comprising a second leakage drain line that communicates from the second leakage chamber out of the spindle housing and back to the coolant supply.

* * * * *